United States Patent
Das

(10) Patent No.: US 9,955,228 B2
(45) Date of Patent: *Apr. 24, 2018

(54) SHARING MOBILE SUBSCRIBER CONTENT IN A PUBLICALLY VIEWABLE CONTENT DISTRIBUTION NETWORK

(71) Applicant: AT&T INTELLECTUAL PROPERTY I, LP, Atlanta, GA (US)

(72) Inventor: Jayanta Das, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/146,233

(22) Filed: May 4, 2016

(65) Prior Publication Data

US 2016/0249110 A1    Aug. 25, 2016

Related U.S. Application Data

(63) Continuation of application No. 14/450,734, filed on Aug. 4, 2014, now Pat. No. 9,363,539.

(51) Int. Cl.
    *H04N 7/16*     (2011.01)
    *H04N 21/488*   (2011.01)
    (Continued)

(52) U.S. Cl.
    CPC ..... *H04N 21/4882* (2013.01); *H04L 65/1016* (2013.01); *H04L 65/4076* (2013.01);
    (Continued)

(58) Field of Classification Search
    CPC combination set(s) only.
    See application file for complete search history.

(56) References Cited

U.S. PATENT DOCUMENTS 6,774,926 B1   8/2004   Ellis
7,344,084 B2   3/2008   DaCosta
(Continued)

FOREIGN PATENT DOCUMENTS

CA    2425479 A1    4/2002
CN    101034995 A   9/2007
(Continued)

OTHER PUBLICATIONS

"Easy Content Share" www.softpedia.com http://www.softpedia.com/get/Multimedia/Video/Other-VIDEO-Tools/Easy-Content-Share.shtml.

(Continued)

*Primary Examiner* — Mulugeta Mengesha
(74) *Attorney, Agent, or Firm* — Guntin & Gust, PLC; Ralph Trementozzi

(57) ABSTRACT

Aspects of the subject disclosure may include, for example, a system receiving a request from a mobile device to distribute mobile video content from the mobile device by way of a television service. The system determines a particular television channel of the television service based on the request, receives the mobile video content and provides program content for the particular television channel. The program content includes the mobile video content. The system also distributes the program content to a television receiver by way of the television service, so that the television receiver can present the mobile video content at a display. Other embodiments are disclosed.

20 Claims, 8 Drawing Sheets

(51) Int. Cl.
*H04N 21/2187* (2011.01)
*H04N 21/4788* (2011.01)
*H04N 21/41* (2011.01)
*H04N 21/231* (2011.01)
*H04N 21/61* (2011.01)
*H04L 29/06* (2006.01)
*H04N 21/239* (2011.01)
*H04N 21/2665* (2011.01)
*H04N 21/2668* (2011.01)
*H04N 21/2743* (2011.01)
*H04N 21/4223* (2011.01)
*H04N 21/254* (2011.01)
*H04N 21/258* (2011.01)
*H04N 21/45* (2011.01)
*H04N 21/4627* (2011.01)
*H04N 21/84* (2011.01)

(52) U.S. Cl.
CPC ..... *H04L 65/4084* (2013.01); *H04N 21/2187* (2013.01); *H04N 21/2393* (2013.01); *H04N 21/23109* (2013.01); *H04N 21/2541* (2013.01); *H04N 21/25883* (2013.01); *H04N 21/2665* (2013.01); *H04N 21/2668* (2013.01); *H04N 21/2743* (2013.01); *H04N 21/4126* (2013.01); *H04N 21/4223* (2013.01); *H04N 21/4532* (2013.01); *H04N 21/4627* (2013.01); *H04N 21/4788* (2013.01); *H04N 21/6112* (2013.01); *H04N 21/6118* (2013.01); *H04N 21/6125* (2013.01); *H04N 21/6131* (2013.01); *H04N 21/84* (2013.01)

(56) References Cited

U.S. PATENT DOCUMENTS

| | | | |
|---|---|---|---|
| 7,907,213 B1 * | 3/2011 | Biere | H04N 7/173 348/552 |
| 8,117,545 B2 | 2/2012 | Rosenbaum et al. | |
| 8,402,496 B1 | 3/2013 | Gilboy et al. | |
| 8,528,028 B2 | 9/2013 | Sheth et al. | |
| 8,656,425 B2 | 2/2014 | Wang et al. | |
| 8,670,752 B2 | 3/2014 | Fan et al. | |
| 8,688,781 B2 | 4/2014 | Taleb et al. | |
| 8,695,033 B2 | 4/2014 | Fasting | |
| 8,713,615 B2 | 4/2014 | Angiolillo et al. | |
| 2005/0226170 A1 * | 10/2005 | Relan | H04H 60/33 370/254 |
| 2006/0123455 A1 | 6/2006 | Pai | |
| 2008/0208963 A1 | 8/2008 | Eyal et al. | |
| 2008/0271080 A1 | 10/2008 | Gossweiler | |
| 2009/0183213 A1 | 7/2009 | Mukerji et al. | |
| 2010/0100603 A1 | 4/2010 | Alston et al. | |
| 2010/0153989 A1 | 6/2010 | Jing et al. | |
| 2010/0299388 A1 | 11/2010 | Bolnick et al. | |
| 2010/0299402 A1 | 11/2010 | Korman et al. | |
| 2012/0189282 A1 | 7/2012 | Wyatt et al. | |
| 2013/0013698 A1 | 1/2013 | Relyea et al. | |
| 2013/0254828 A1 | 9/2013 | Reimers et al. | |
| 2013/0311669 A1 | 11/2013 | Reimers et al. | |
| 2014/0115643 A1 | 4/2014 | Meredith et al. | |

FOREIGN PATENT DOCUMENTS

| | | |
|---|---|---|
| WO | 0119084 A1 | 3/2001 |
| WO | 2009011894 A2 | 1/2009 |
| WO | WO 2013/0124814 * | 8/2013 |

OTHER PUBLICATIONS

"iMediaShare" en.kioskea.net http://en.kioskea.net/faq/29090-share-multimedia-content-between-your-ios-andandroid-devices.

"Multimedia Content Sharing Software to Simplifies Corporate Knowledge Sharing" www.bloomfire.com https://www.bloomfire.com/content-sharing/.

"Samsung Link" www.techhive.com http://www.techhive.com/article/2038931/samsung-link-set-to-replace-allshare-playmultimedia-sharing-app.html.

"Universal Mobile Telecommunications System (UMTS); LTE; IP Multimedia Subsystem (IMS) based Packet Switch Streaming (PSS) and Multimedia Broadcast/Multicast Service (MBMS) User Service; Protocols (3GPP TS 26.237 version 11.3.0 Release 11 )", Technical.

* cited by examiner

200

400

SHARING MOBILE SUBSCRIBER CONTENT IN A PUBLICALLY VIEWABLE CONTENT DISTRIBUTION NETWORK

CROSS-REFERENCE TO RELATED APPLICATIONS

This application is a continuation of and claims priority to U.S. patent application Ser. No. 14/450,734, filed Aug. 4, 2014 by Das, entitled "Sharing Mobile Subscriber Content in a Publically Viewable Content Distribution Network," which is hereby incorporated by reference into this application as if set forth herein in full.

FIELD OF THE DISCLOSURE

The subject disclosure relates to sharing mobile subscriber content in a publically viewable content distribution network.

BACKGROUND

The deployment of next-generation wireless technologies, such as Long Term Evolution (LTE), WiMAX and 4G, are well underway. Incorporation of such technologies into mobility networks generally results in significant improvement to data throughput compared to other legacy 3G technologies. Consequently, downlinks can experience increases in data rates of up to three to five times, while uplink data rates can experience increases in data rates of a factor of two to three times.

Likewise, there have been great strides in innovations to hand-held, mobile devices, such as smart-phones and tablet processors. Namely, each generation of mobile device generally includes improved hardware, such as built-in still and digital video cameras providing greater resolution, more storage and greater processing speeds. The significant improvements to data transfer in combination with enhancements in mobile devices will invariably lead to an increased demand for multimedia applications.

BRIEF DESCRIPTION OF THE DRAWINGS

Reference will now be made to the accompanying drawings, which are not necessarily drawn to scale, and wherein.

DETAILED DESCRIPTION

Figure 1:
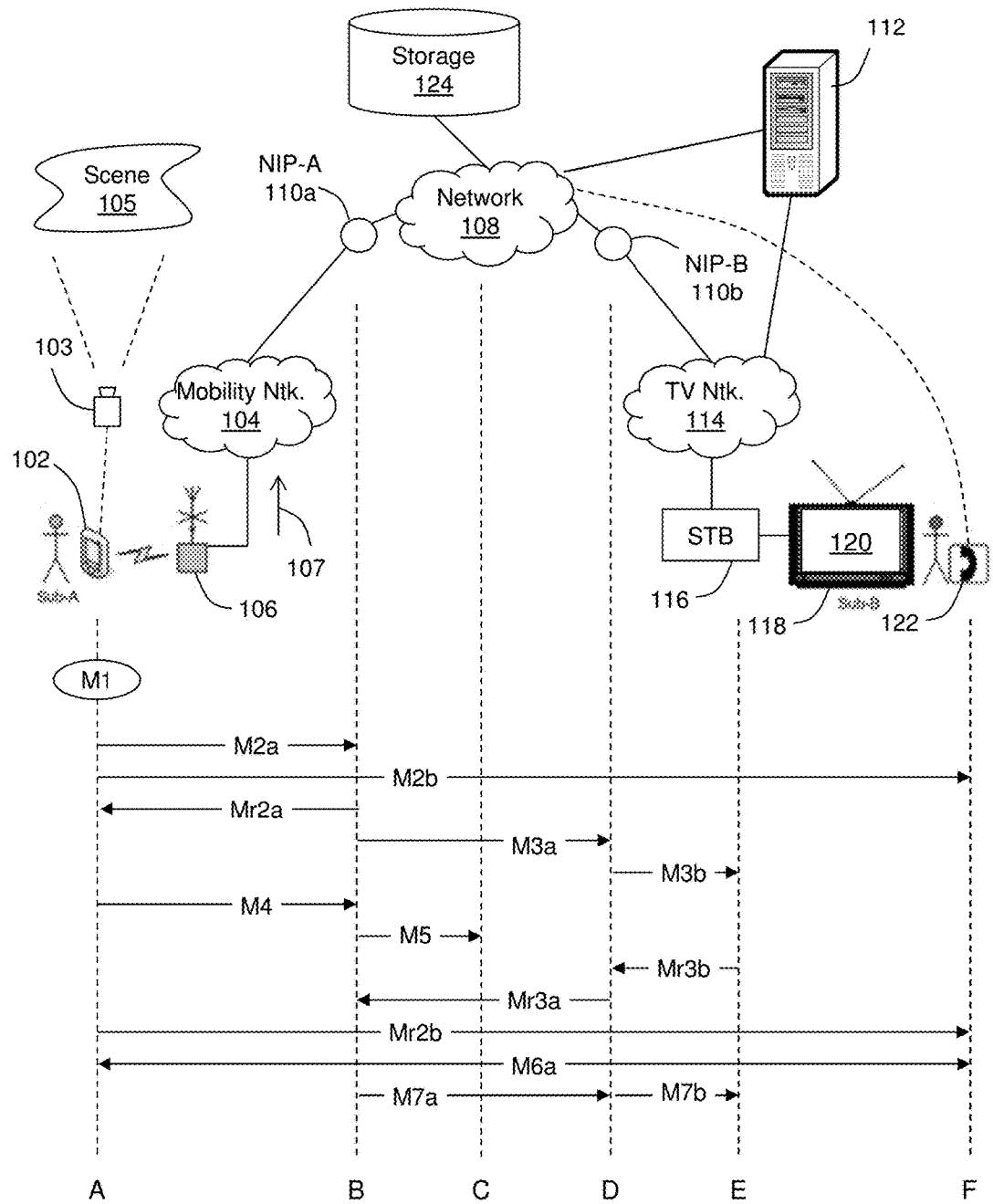
FIG. 1 depicts an illustrative embodiment of a personal television channel distribution system.

The subject disclosure describes, among other things, illustrative embodiments for impromptu acquisition of rich media content from wireless broadband mobile user equipment and dissemination of such content to television receivers by way of a television channel. Other embodiments are described in the subject disclosure.

One or more aspects of the subject disclosure include broadband mobile user equipment or devices that provide impromptu rich media content to a television distribution facility. At least a video portion of the rich media content can be captured by a video camera and transported over a wireless network as streaming media to the television distribution facility. The streaming media serves as program content of a television channel that can be distributed to equipment of one or more television viewers. Viewer access to the television channel can be unrestricted, as in public, or restricted according to various access-restriction techniques, such as those disclosed herein.

One embodiment of the subject disclosure includes a process that receives, by a system comprising a processor, a request from a mobile device to distribute mobile video content from the mobile device by way of a television service. A particular television channel of the television service is determined by the system based on the request. The mobile video content is received by the system and program content including the mobile video content is provided by the system for the particular television channel. The program content is distributed by the system to a television receiver by way of the television service, wherein the television receiver presents the mobile video content at a display.

Another embodiment of the subject disclosure includes a device having a memory to store executable instructions and a processor in communication with the memory. The processor, responsive to executing the instructions, facilitates performance of operations including receiving a notification from a mobile device that live video content is available at the mobile device. A request is received from the mobile device to distribute the live video content from the mobile device by way of a television distribution service. The live video content is received from the mobile device and associated with a particular television channel of the television distribution service, which is distributed to equipment of a television viewer. The equipment of the television viewer processes the television signal to obtain the live video content for presentation at a display device.

Yet another embodiment of the subject disclosure includes a machine-readable storage medium including executable instructions. The instructions, responsive to being executed by a processor, cause the processor to facilitate performance of operations including receiving a notification that live video content is available at a mobile device. A request is received to distribute live video content from the mobile device to a television receiver by way of a television distribution service. The live video content is received and associated with a particular television channel of the television distribution service. A television signal comprising the particular television channel is distributed to the television receiver, wherein the television receiver presents the live video content at a display.

FIG. 1 depicts an illustrative embodiment of a personal television channel distribution system 100. In this embodiment, video content obtained from a mobile device 102 is provided as program content of a television channel and delivered to a television receiver 118. In some embodiments, the television receiver is included within a media processor 116, such as a set-top box, in which received video content is provided by the media processor 116 to a display device for presentation on a display 120.

Examples of the mobile device 102 include one or more of a smartphone, a tablet device, a laptop computer, a media processor, a wireless telephony device, such as a wireless telephone, and the like. Audio and/or video equipment, such as a video camera, can be integral to the mobile device 102, or separate, as in traditional video equipment or cameras 103, camcorders and webcams. A separate audio and/or video equipment or camera 103 communicates with the mobile device 102 according to any of a number of connectivity technologies. Examples include a direct cable connection, such as Universal Serial Bus (USB) connection, an Institute of Electrical and Electronics Engineers (IEEE) 1394, e.g., Firewire® connection, small computer serial interface (SCSI) connection or other wired connection, and the like, or wireless connectivity, such as 802.11a, b, g, n (referred to generically as 802.11x), Bluetooth, Ultra Wideband (UWB) or other wireless connection. (Firewire® is a trademark registered to Apple Inc.)

The mobile device 102 generates video content based on video captured by the video camera 103, and transfers the captured video content to a personal channel server 112. The video content can portray a live scene 105 that is within view of the video camera 103. The captured video may be filmed in real-time by a user or subscriber associated with the mobile device 102 and/or the video camera 103. The scene 105 can include any event that may be filmed by the video camera 103. For example, a parent may utilize the video camera 103 and mobile device 102 to film a child's soccer game or other event. In this sense, the captured video may be anticipated, as in association with a scheduled event. In other instances, the user may happen upon an event, unexpectedly, that the user would like to share with others. The user is sometimes referred to herein as an author and/or producer of the video content. It is understood that video content authored by another individual can be provided to the mobile device for dissemination according to the subscriber of the wireless device.

The mobile device 102 can publish the user-generated live video to a television distribution network 114 in real-time, or at least near-real-time by way of the personal channel server 112. Scheduling of such transmissions can be according to a scheduled time, or seemingly randomly in an impromptu fashion. Slight delays may arise from processing delays that may amount to a fraction of a second, to a few seconds or more. In some embodiments, intentional delays can be included, e.g., to allow time for editing by another entity, such as a television broadcaster, or for self-editing. If an impromptu scene 105 is being and presented according to the techniques disclosed herein becomes suddenly graphic and inappropriate for certain audiences, an editing authority, such as the user, can opt to end, or pause video presentation for at least a short period of time. A delay loop, in some instances including a user selectable delay period, can be used to pause or end a video presentation at an earlier time period controlled by the delay. The delay loop allows the video broadcast to be paused or terminated before the graphic or otherwise unwanted scene is presented to equipment any viewers. The delay loop can be used in combination with a blanking or beep function to block out or otherwise mask such inappropriate segments.

The mobile device 102 can publish the user-generated live video to the wireless or mobility network 104 and television distribution network 114 automatically in accordance with predefined settings or in response to any predefined event, such as in response to a user (e.g., the parent's mother) providing a user input command to publish the live video. In certain examples, the system 100 can limit the distribution of the published live video to a group of one or more users included in a predefined user group (e.g., members of a family) in accordance with a user's media sharing settings, which may be defined in the user's user profile.

The video content is transferred from the mobile device 102 to the personal channel server 112 by way of one or more network connections or paths. In the illustrative embodiment, wireless communications is established between the mobile device 102 and a wireless access point 106. The wireless access point 106, can be a WiFi access point or a base transceiver station (eNodeB) of a wireless network. In at least some embodiments, the network path traverses a mobility network 104, a core network 108 and a television distribution network 114. The mobility network 104 operates according to any of a number of suitable wireless access protocols, such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on.

The core network 108 can be a public network, such as a wide area network, e.g., the Internet, a metropolitan network, or a private network, such as a private carrier network, an internet services provider network, a campus network, a local network, or a combination of one or more such networks. In some embodiments, the core network 108 can be the enhanced packet core of an LTE network. It should be understood that the network 108 can include physical components, such as routers, switches and/or gateways, virtual elements, or some combination of both.

An arrow 107 represents a video feed transmitted and carrying data representative of the captured live video from the mobile device 102 to the personal channel server 112 by way of the mobility network 104 and ultimately to the television distribution network 114 for distribution as television channel content. It is understood that in some applications, one or more of the mobility network, the core network 108 or the television distribution network 114 are controlled or otherwise operated by the same entity. Examples include network carriers that offer so-called "triple-play" service (voice, Internet, television), or "quadruple-play service" (voice, Internet, television and mobile). For situations in which one or more of the varied services are provided by different service providers, it is envisioned that suitable connectivity or network feeds are established to forward data in a virtually seamless manner.

The television distribution network 114 can include one or more of terrestrial broadcast television service, satellite delivery service, cable delivery service, or internet protocol television (IPTV) service. Terrestrial broadcast television can include digital terrestrial television (DTTV), or legacy analog broadcast television. DTTV uses multiplex transmitters to allow reception of multiple channels on a single frequency range (such as a UHF or VHF channel) known as subchannels. One or more such subchannels can be designated as personalized television channels within a given broadcast coverage area. Any of the personal TV channels disclosed herein can represent a channel or sub channel of the television distribution network 114.

With respect to cable system television distribution network 114, television programs (analog or digital) are distributed to paying subscribers via radio frequency signals transmitted through coaxial cables or light pulses through fiber-optic cables. Multiple television channels are distributed to subscriber residences through a coaxial cable using frequency division multiplexing. Each channel is given a different frequency "slot" on the cable. At the subscriber's residence, either the subscriber's television or a media processor, e.g., a set-top box, translates the desired channel back to its original frequency (baseband), for presentation at the display 120. At a local headend, the feed signals from the individual television channels are received by dish antennas from communication satellites. Additional local channels, such as local broadcast television stations, educational channels from local colleges, and community access channels devoted to local governments (PEG channels) are usually included on the cable service. It is envisioned that the personalized channels can be inserted at the local headend in a similar manner.

Television services, such as IPTV television services, can be delivered using an internet protocol suite over a packet-switched network such as a LAN or the Internet, instead of or in addition to being delivered through traditional terrestrial, satellite signal, and cable television formats. IPTV services can include multimedia services such as television, video, audio, text, messaging, graphics and/or data delivered over IP based networks managed to provide the required level of quality of service to ensure a positive viewer experience, to provide for security, and, in at least some instances, to support interactivity.

The illustrative embodiment, the personal channel server 112 associates the video content obtained by the video feed 107 with a particular personal channel for distribution to television receivers 118 of one or more subscribers. For example, the personal channel server 112 directs, marks or otherwise identifies the video content as program content for the particular personal channel Such marking can include one or more of adding, modifying or otherwise providing metadata to the video content. Such metadata can be used to associate or otherwise identify the video content as program content for the particular channel. Alternatively or in addition, the personal channel server 112 can perform or otherwise direct the video content to be incorporated into a media feed including program content destined for broadcast on the particular personal channel. In some embodiments the personal channel server 112 can provide one or more other functions, such as billing, provisioning (of network resources and/or of personal television channels), advertising, soliciting and providing content ratings, recording content, cataloging broadcast and/or recorded or otherwise stored mobile video content, imposing access restrictions, managing subscribers and related subscriber accounts, and managing user profiles.

It is envisioned that presentation of video content according to the personalized television channels can include advertising. Advertising can be provided as overlays, for example, being visible during viewing of personal channel content (e.g., according to a banner, border, frame or window). Advertising can also be presented at other times, e.g., during account management activities, in association with cataloging of historical content presented on a particular channel, as well as in association with cataloging of on-demand content derived from the impromptu live broadcasts. Alternatively or in addition, advertising can be provided within the video content itself, e.g., as commercials spliced or otherwise linked to video content for presentation on a particular personalized content channel. For example, commercials can be run upon initiation of a broadcast, upon its conclusion and/or at other times during the broadcast. Video buffers may be used to preserve content streamed during such commercial breaks occurring during presentation of the video content.

One or more of statistics and or ratings can be generated in association with a particular personalized content channel, a particular program presented on such a channel, or a combination of both. Such ratings or statistics can be based on one or more of a number of subscribed viewers to a particular channel, a quantity and/or quality of video content presented on the particular channel, whether viewers tuned in and/or out during video content presentation(s), user comments or reviews. For example, user reviews can be obtained by a brief survey presented to a viewer of content on the particular channel. The survey can be presented upon conclusion of the broadcast, upon an event, such as a channel change, or at a later time. The survey can be solicited by way of an interactive television network, or by a separate means, such as a text message, an email message, a telephone call, a pop-up screen, and the like.

In an embodiment of the present invention, the personalized channel is created with privacy rights that restrict the access of the channel. For instance, a video author or producer, Sub-A, creates a personalized television channel by using the video camera 103 to record the scene 105. Access rights to the personalized television channel, such as via password, subscriber registration or other secure access technologies, could be given to the Sub-A's friends and family that subscribe to the personalized channel service to be able to view and listen to media content authored by Sub-A.

In another embodiment, the personalized television channel can be created as a public channel, such as a standard channel, premium channel, video on demand channel or pay-per-view channel, that is available on an unrestricted basis to other subscribers of television distribution network 114 and/or accessed as a streaming video signal over the Internet, with or without privacy restrictions, and with or without an additional fee. For instance, an author or producer, Sub-A, may wish to serve multimedia content having general appeal, such as newsworthy content, comedic content, sports content, and the like.

Further, subscribers that are budding playwrights, musicians, conductors and directors can create their own audio and video programming that is sent to the television distribution network 114 on a "live" basis or that may be uploaded and stored in a centralized location, such as network storage 124, and scheduled for transfer to the television distribution network 114 at selected times, or at opportune times. Such opportune times can include periods of bandwidth availability, particularly in the context of a shared personalized channel. In an embodiment of the present invention, a subscriber may obtain a fractional channel, corresponding to particular programming times and/or bandwidth availability for a personalized television channel that is shared by multiple subscribers. These fractional channel rights may be established according to a one-time basis, e.g., in connection with a one-time event such as a single broadcast of a concert, birthday party, family reunion, or to accommodate other programming such as user created music, plays, video clips, movies, etc., on either a live or recorded basis. In addition, these fractional channel rights may include periodic programming slots, such as the $15^{th}$ of each month at 1:00 pm-3:00 pm, every Tuesday from 6:30 pm-7:00 pm, etc.

In one mode of operation, the option of obtaining a subscriber channel (including fractional channel rights as described above) can be a fee-based service of the television distribution network 114. Subscribers wishing to generate their own personalized television channel could pay a periodic fee to the cable network such as a monthly or annual fee, or a one-time use fee to obtain channel rights for either a dedicated channel, fractional channel or one-time use of a subscriber channel. In an embodiment of the present invention, the fee charged (if any) can be based in whole or in part on factors such as full versus fractional use, the amount of time used, the placement of the channel in the channel lineup, priority, bandwidth, optional rights to name the channel, whether the channel is private or public, the type of optional privacy restrictions, whether ads are allowed, whether the ads generate revenue to the subscriber or to the cable company, the time of day or time of week of the fraction channel rights, etc. Alternatively or in addition, the subscribers that view the personalized television channel, either singly or together with a group of other subscriber channels or other channels can be charged to view the channel in a manner similar to a video-on-demand, pay-per-view broadcast or premium channel. All or a portion of the fees collected from other viewers of the subscriber channel could be remitted to the subscriber as revenue or used to offset some or all of the cost to the subscriber for the subscriber channel, etc. It is understood that general billing practices can be based on one or more of reserved services, actual usage, delivered quality of service, offsets for ad revenue, popularity, and the like.

The multimedia content can be in the form of one or more video signals, audio signals, multimedia signals or other media signals that are either real-time signals in analog or digital format or data files that contain media content in a digital format. For instance, the media content can be transferred as in a broadcast video signal, such as a television signal, high definition televisions signal, enhanced high definition television signal or other broadcast video signal that has been transmitted over a wireless medium, either directly or through one or more satellites or other relay stations or through a cable network, optical network or other transmission network. Further, the media content can be included in a digital audio or video file, transferred from a storage medium such as a server memory, magnetic tape, magnetic disk or optical disk, or can be included in a streaming audio or video signal that is transmitted over a public or private network such as a wireless or wired data network, local area network, wide area network, metropolitan area network or the Internet.

The media processor 116 can provide a user interface, for example, in combination with the display 120, to obtain set-up, selections and control regarding the set-up and operation of the personalized television channel, to receive other user commands and selections in conjunction with the standard media processor functionality and to provide other selections, commands and other data inputs that are specific to the one or more features related to generation, access and/or presentation of video content delivered by the personalized television channel.

The lower portion of FIG. 1 provides an illustrative example of interaction or coordination between various components of the system 100. Namely, the mobile device 102 can include an application program, or app, that supports impromptu authoring of live video content to a personalized television channel. A mobile user, Sub-A, sees something interesting (scene 105) and starts the video-sharing app that may be resident on the mobile device 102, with the intention to share it in real-time or near real-time with friends and/or family on a personalized television channel. The mobile app is accessed at M1 to initiate impromptu video broadcast. It is understood that in at least some embodiments, the app is provided according to a client-server model, in which a client portion of the app is resident on the mobile device 102, with a server portion of the app resident elsewhere. For example, the app may be resident on the personal channel server 112, or some other application server (not shown).

The mobile app, at M2b, requests a mobile bearer set-up (e.g., an LTE EPS bearer), having a prescribed QoS suitable for delivery of streaming video of a predetermined size, resolution and/or quality. In at least some embodiments, the mobile app, at Mr2a, also requests a (conference) voice call to equipment of one or more individuals. The individual(s) can include a list of recipients, for example corresponding to those subscribers authorized to receive the personalized television channel. In at least some instances the individual(s) can include non-subscribers being presented with a voice call, such as a call related to one or more of the live video content or the personalized television channel Such a voice call can include an offer to subscribe to or otherwise tune to the personalized television channel. The list can be adjusted, for example, according to a recipient subscriber's presence status, and/or according to tailoring or add/drops to an otherwise predetermine list. The mobility network 104 confirms the completion of the mobile bearer set-up at M3a.

A first network element 110a at a first network integration point-A (NIP-A) requests a QoS enabled 'path' in the core network 108 at M3b up to a second network element 110b at a second network integration point-B (NIP-B) with final destination to the equipment of the subscriber Sub-B (and others from the list if applicable, e.g., according to a multicast presentation of the personalized television channel). The second network element 110b at M3a extends the QoS path request to the media processor 116 of Sub-B. Although the network integration points 110a, 110b are illustrated as being external to the networks 104, 108, 114, it is understood that they can be associated, e.g., contained within, one or more of the networks 104, 108, 114.

The television distribution network 114 completes the QoS enabled path establishment at M4. The mobile app streams the impromptu video content at M5 to the network 108 in a radio uplink on the mobile bearer. In some embodiments, the network 108 stores, at Mr2b, the streamed video content in the network storage 124. Sub-B answers the voice call using the telephone 122 and switches the TV receiver 118 or media processor 116 to the 'Personal TV Channel' at M6a. Sub-A and Sub-B are free to engage in conversation by way of the established voice session at M7a and M7b, while the television distribution network 114 streams the real-time content to the personalized television channel.

In at least some embodiments, a request to 'Switch to Personal Channel' TV screen pop-up notification is sent at M3b. Thus, viewer equipment 116, 118 may be tuned to a different channel (e.g., a network broadcast or video on demand), when a notification of the availability of video content on the personalized television channel is received. The TV screen pop-up notification is presented, e.g., as an overlay, to whatever other program content, live, or recorded, being presented at the viewer equipment 116, 118, 120. The notification allows the viewer to tune to the personalized channel if so desired.

In some embodiments, the pop-up notification identifies one or more of the personal channel, the subscriber associated with the video content, or some other indicia related to one or more of the video author and/or the content, such as a geolocation of the mobile device 102. In some embodiments, the viewer equipment 116, 118, 120 can present a notification even if program or recorded content is not being viewed at the time. Such notification can include an audible alert or alarm, a visual indicator, such as a front panel display (a light, LED and/or alphanumeric display).

It is envisioned that other means of notification can be provided alone or in combination with the aforementioned pop-up notifications. Other notifications as to the availability of personal channel content can be provided by way of text messages (e.g., SMS), email messages, phone calls and the like. The notification can provide a viewer to selectively tune to the personal channel if so desired, or to simply take note that personal material is available on the personal television channel. The personal television content can be viewed and/or recorded. The recording can be configured to automatically record content from one or more particular personal channels. The recording can be accomplished if a viewer is watching another show, if the viewer tunes to the personal television channel, or even if the viewer is not present. The recordings can be accomplished locally, e.g., by way of a DVR and/or remotely, e.g., at the centralized network storage 124. In some embodiments, personal video content is identified in a video catalog or electronic program guide. When available in recorded form, the otherwise live presentation can be viewed at a later time.

In some embodiments, impromptu video content is store centrally in a video server or database 124. The video content items can be cataloged according to one or more of a producer or source, content, geolocation, viewer rating, quality, duration, etc. Whether stored local or centrally, recorded video content can be retrieved or otherwise shared according to various techniques including file sharing, video on demand, peer-to-peer sharing and the like. When cataloged, it is envisioned that access to the catalog content can be access restricted, as well. Thus, only viewers that are authorized to access video content of a particular producer will have access to catalog content, including catalog indicia, of any recorded content.

Authorized viewers might include virtually unrestricted access or public, as in all subscribers or television viewers. Authorization can also be controlled according to individuals or groups. By way of examples, group membership might include employees of an organization, alumni of an educational institution, club members, affinity groups, and the like. Group membership might also include defined groups, such as friends and/or family Group membership can be controlled by the video author or producer, by consumers, as in the television service subscribers, or by some combination of both producers and consumers.

It is also understood that video content made available in real-time by way of the personalized television channel to one group of subscribers, or authorized viewers may be accessible in recorded form by the same or a different group of viewers. For example, it may be recognized that an impromptu video production originally distributed in real-time to a limited number of authorized subscribers may have wider appeal. There may be some newsworthy aspect, such as an exciting soccer goal, a comical situation or the like the original author or producer may wish to share in a larger sense. In such circumstances, the author or producer might establish a different group of authorized users for the recorded version, e.g., a private or semi-private live broadcast might be made available in a recorded form to a wider audience, e.g., public, accessible to all subscribers, and vice versa). The recorded versions might be accessible by the same and/or different technologies (e.g., TV, pay-per-view, computer, web application, YouTube®, peer-to-peer). (YouTube® is a trademark registered to Google Inc.).

Figure 2:
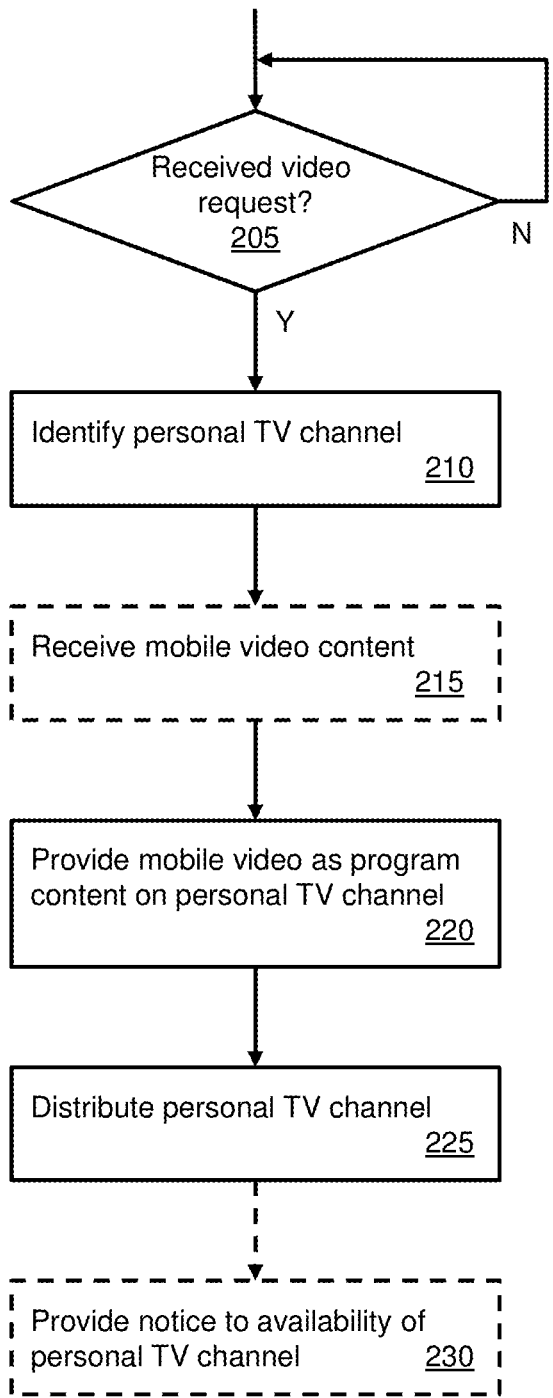
FIG. 2 depicts an illustrative embodiment of a process used in portions of the system described in FIG. 1.

FIG. 2 depicts an illustrative embodiment of a process 200 used by elements of the personal television channel distribution system 100. In particular, the process 200 can be implemented at least partially within the personal channel server 112 (FIG. 1). The server 112 determines a video request has been received at 205. The request can be a request message sent from a mobile app on the mobile device 102. The request might identify one or more of an identity of the author and/or producer of the video content, the equipment of the author and/or producer, a particular personal TV channel, or the like.

The particular personal TV channel upon which the impromptu video content will be presented is determined or otherwise identified at 210. Identification of the particular personal TV channel can be obtained from the message itself, where so identified. For example, the author and/or producer can select a particular personal TV channel according to a mobile app. The mobile app can generate a request message identifying one or more of the source subscriber and the particular personal TV channel. In at least some embodiments, the source subscriber is a mobile service subscriber. In some embodiments, the source subscriber identifies an intended recipient or group of recipients, allowing the server 112 to identify or otherwise determine a suitable personal TV channel Selection of the particular personal TV channel by the server 112 can be accomplished by one or more of available resource bandwidth, broadcast (television network) status and/or conditions, locations (geo-locations and/or network locations) of one or more of the source subscriber and/or recipient subscribers, video size, quality and/or resolution, and the like.

In some embodiments, the server 112 receives mobile video content associated with the impromptu request at 215. In this manner, the mobile video content can be routed directly through the server 112, or otherwise directed from the server 112. Accordingly, step 215 is shown in phantom to signify it is optional. For embodiments in which the video content is not routed through the server, handling of the control plane and data plane can be split. For example, the control plane can be routed through the server 112, allowing the server to control distribution of the video content according to the television distribution network 114, without requiring that a data plane be routed in the same manner. Thus, network capacity of the server 112 can be less than would otherwise be required to route or otherwise distribute video content directly from multiple source subscribers to multitudes of recipient subscribers.

"Having received the request at 205, and identified the personal TV channel at 210, the server provides the mobile video content as program content on the identified personal TV channel at 220. The personal TV channel is distributed across the television distribution network 114 at 225. In some instances, the personalized TV channel is distributed to particular recipients, e.g., according to a recipient identifier (e.g., an IP address provided by an internet services provider, such as a "triple-play" provider, and/or a MAC address) in an IPTV network. Distribution can be limited, or otherwise tailored according to generally well understood techniques. In at least some embodiments, a notice as to the availability of impromptu content on the particular personal TV channel is provided at 230. As this feature is optional, it too is shown in phantom.

Figure 3:
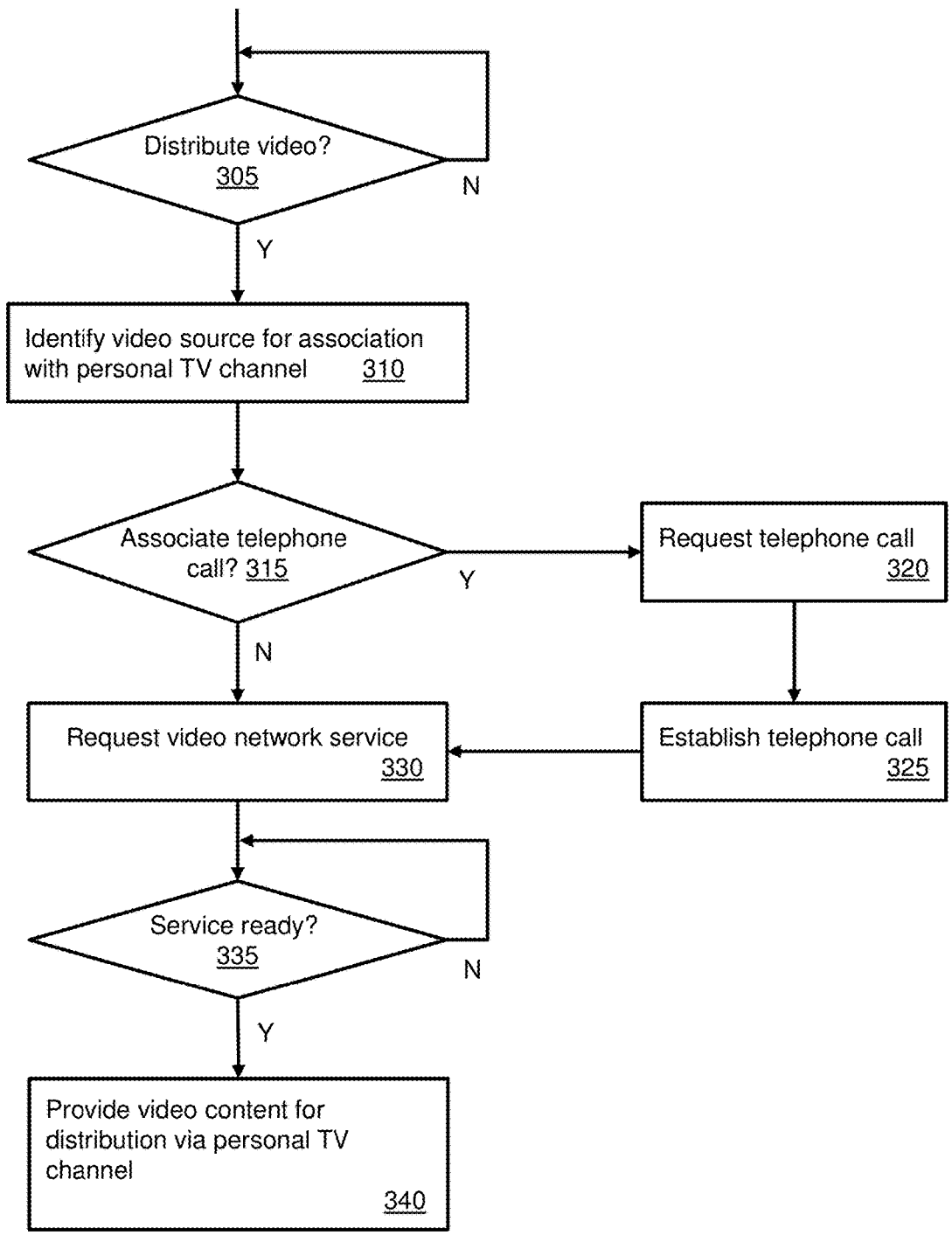
FIG. 3 depicts an illustrative embodiment of another process used in portions of the system described in FIG. 1.

FIG. 3 depicts an illustrative embodiment of another process 300 used by elements of the personal television channel distribution system 100. In particular, the process 300 can be implemented at least partially within the mobile device 102 (FIG. 1). The mobile device 102 determines a request to distribute impromptu video content at 305. The request can be obtained from a mobile app resident on the mobile device, according to a request obtained by way of a user interface of the mobile device 102. For example, opening the app from the mobile device launches the app and can automatically generate a request for distribution of impromptu personal video content.

A video source is identified at 310, for association with the particular personal TV channel. The video source can be obtained from the mobile app, e.g., according to authorization information as in a username and/or password entered into the app. Alternatively or in addition, the source identity is obtained from one or more of the video camera 103 or the mobile device 102. Mobile devices, such as smart phones, generally have an equipment ID or other such information to identify the device and allow mobility network carriers to identify the associated subscriber, subscriber account, preferences and the like.

In some embodiments, the application allows for an associated telephone call. The mobile device, e.g., the app, determines whether an associated telephone or conference call is required at 315. Answer can be obtained from a user profile, e.g., always request telephone call, never request telephone call, request telephone call according to another characteristic, such as the particular television channel and/or recipient subscribers or followers. To the extent a telephone call is determined at 315, a network request for the telephone call is determined at 320, and the call is established at 325.

Regardless as to the existence of the associated telephone call, a request for video network service is made at 330. The request can be deliberate, e.g., according to a special request for a suitable network connection to deliver video content. Identification of attributes of the video content, such as size, quality, resolution, latency, and the like can be made along with the request. In some instances the request is implicit in receipt of video packets from the mobile device 102, including the video content.

It is understood that the video content can be distributed or otherwise broadcast from the mobile device 102 according to any generally acceptable protocol and/or technique. Without limitation, one example includes establishment of a video stream according to a video compression/encoding protocol, such as MPEG-2.

Once it has been established by the mobile device 102, e.g., by the mobile app, that the video delivery channel or service has been established at 335, the video content is distributed or otherwise transmitted from the mobile device 102 at 340. The video content is associated with the particular television channel, for example, by the server 112, and distributed to TV viewers, including intended recipients, by way of the television distribution network 114.

Figure 4:
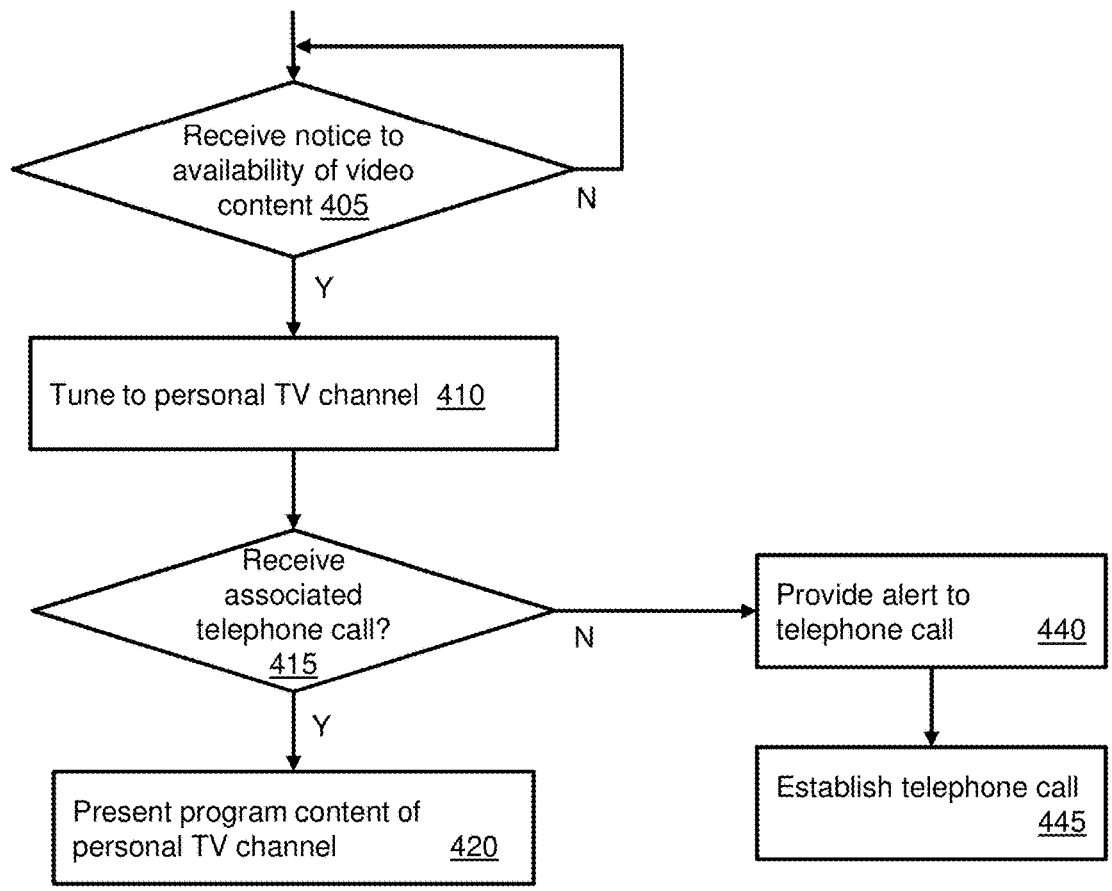
FIG. 4 depicts another illustrative embodiment of yet another process used in portions of the system described in FIG. 1.

FIG. 4 depicts an illustrative embodiment of yet another process 400 used by elements of the personal television channel distribution system 100. In particular, the process 400 can be implemented at least partially within equipment of the recipient subscriber, such as the media processor 116 and/or the television receiver 118. A notice to availability of video content is received by the recipient's equipment 116, 118 at 405. The notice can identify one or more of the particular personal TV channel, the source subscriber, or other indicia of the source, channel and/or content. The recipient's equipment determines at 405, whether a command to tune to the personal TV channel has been received. The command can be obtained from a user interface, e.g., a front panel channel change control or keypad entry, a graphic user interface presented at the display 120 and/or by way of a remote control, e.g., a wireless remote control (not shown). To the extent the command has been received, the recipient's equipment 116, 118 is tuned to the particular personal TV channel at 410.

The recipient's equipment determines at 415, whether an associated telephone call has also been received. The recipient's equipment can detect a call according to a VoIP app running on the recipient's equipment. Alternatively or in addition, receipt of the associated call is detecting according to the recipient's telephone 122. The telephone 122 may ring signifying an incoming call. The telephone can be a POTS telephone instrument, a VoIP telephone, a cordless telephone operating according to a cordless telephone protocol, or a mobile telephone. A caller ID can identify one or more of the source and/or producer subscriber, the particular personal TV channel, or more generally that the call relates to video content available on a corresponding personal TV channel. To the extent that it is determined that there is an associated telephone call, an alert to the telephone call is provided at 440. The alert can be, as indicated, a pop-up on the display 120, an audible alert at the TV receiver 118, an audible alert at the telephone, and/or a caller ID at one or more of the recipient equipment 116, 118, 120, 120. The telephone call can be established at 445, e.g., if the recipient subscriber answers the call. In at least some embodiments, the call can be answered automatically, as a matter of course upon one or more of notification of the availability of the personal TV channel content, and/or tuning to the personal TV channel Program content of the particular personal TV channel is ultimately provided at 420. Presentation can include presentation of the video upon the display device 120. Many of the examples herein refer to rich media content or video content.

It should be noted that such rich media content can include one or more of video content or associated audio content, e.g., from a microphone of the camera and/or smartphone. The video content can be 2D or 3D depending upon the features of the camera, user preferences and/or channel capabilities.

Figure 5:
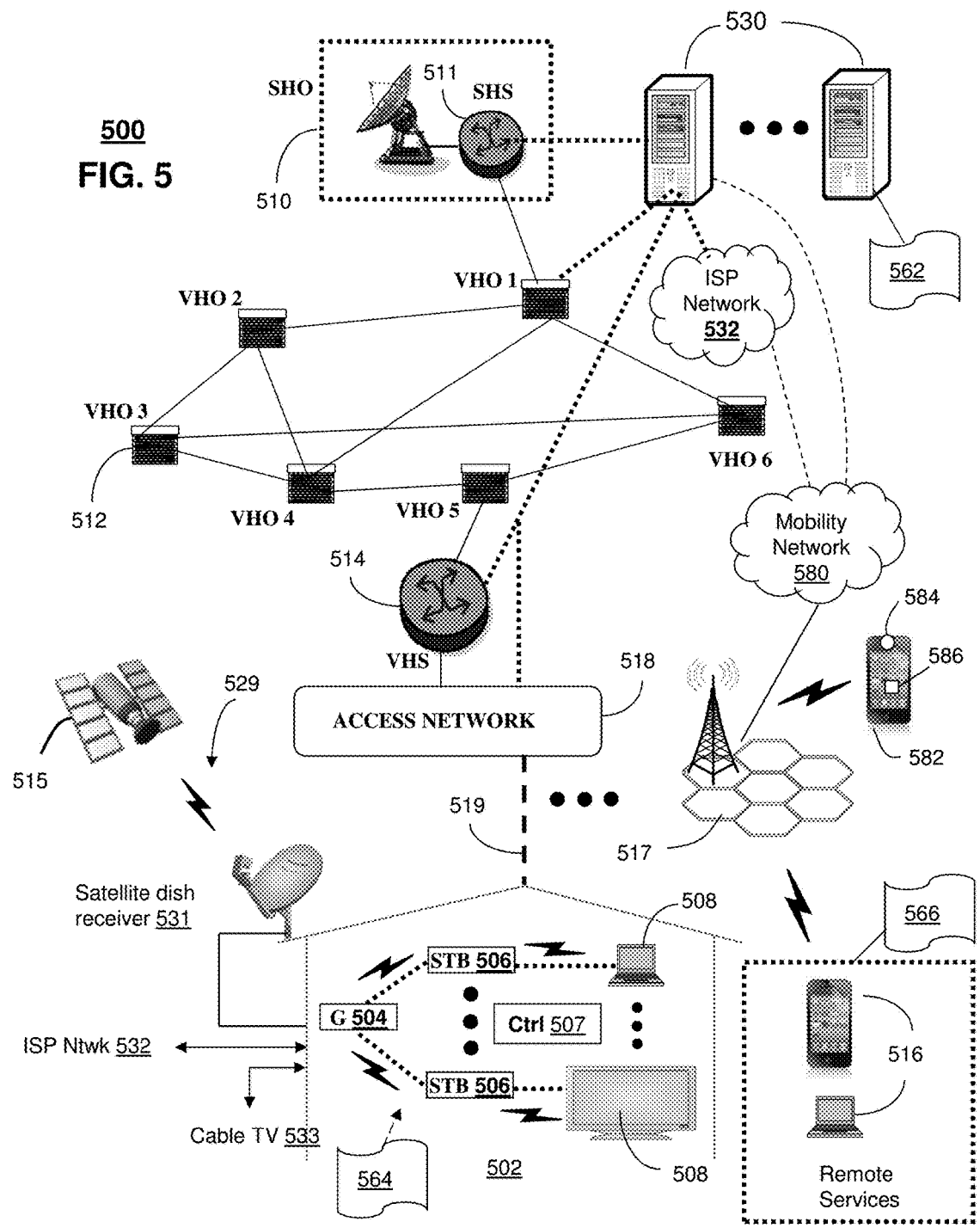
FIGS. 5-6 depict illustrative embodiments of communication systems that provide media services, including personal television channel distribution according to the processes of FIGS. 2-4.

FIG. 5 depicts an illustrative embodiment of a first communication system 500 for delivering media content. The communication system 500 can represent an IPTV media system. The communication system 500 can be overlaid or operably coupled with the personal television channel delivery system 100 of FIG. 1, as another representative embodiment of communication system 500. For instance, one or more devices illustrated in the communication system 500 of FIG. 5, such as the personalized channel server 530, includes a process that receives a request from a mobile device 582 to distribute mobile video content from the mobile device 582 by way of a television service. A particular television channel of the television service is determined by the system based on the request. The mobile video content is received by a wireless access base station 517 and routed through a mobility network 580 to the personalized television channel server 530. The server 530 provides program content including the mobile video content for the particular television channel. The program content is distributed by one or more video head-end servers 512, 514 to a media processor 506 coupled to a television receiver having a display 508 by way of an access network 518. The television receiver presents the mobile video content at the display 508.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

The communication system 500 can also provide for all or a portion of the computing devices 530 to function as a personalized television channel server (herein referred to as personal channel server 530). The personal channel server 530 can use computing and communication technology to perform function 562, which can include among other things, associating impromptu video content received from the mobile device 584 with a personalized television channel, according to the techniques described by processes of FIGS. 2-4. The media processors 506 and wireless communication devices 516 can be provisioned with software functions 564 and 566, respectively, to utilize the services of the personal channel server 530. For instance, functions 564 and 566 of the media processors 506 and wireless communication devices 516 can be similar to the functions described for the media processor and/or television receiver of FIG. 1 in accordance with the processes of FIGS. 2-4.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
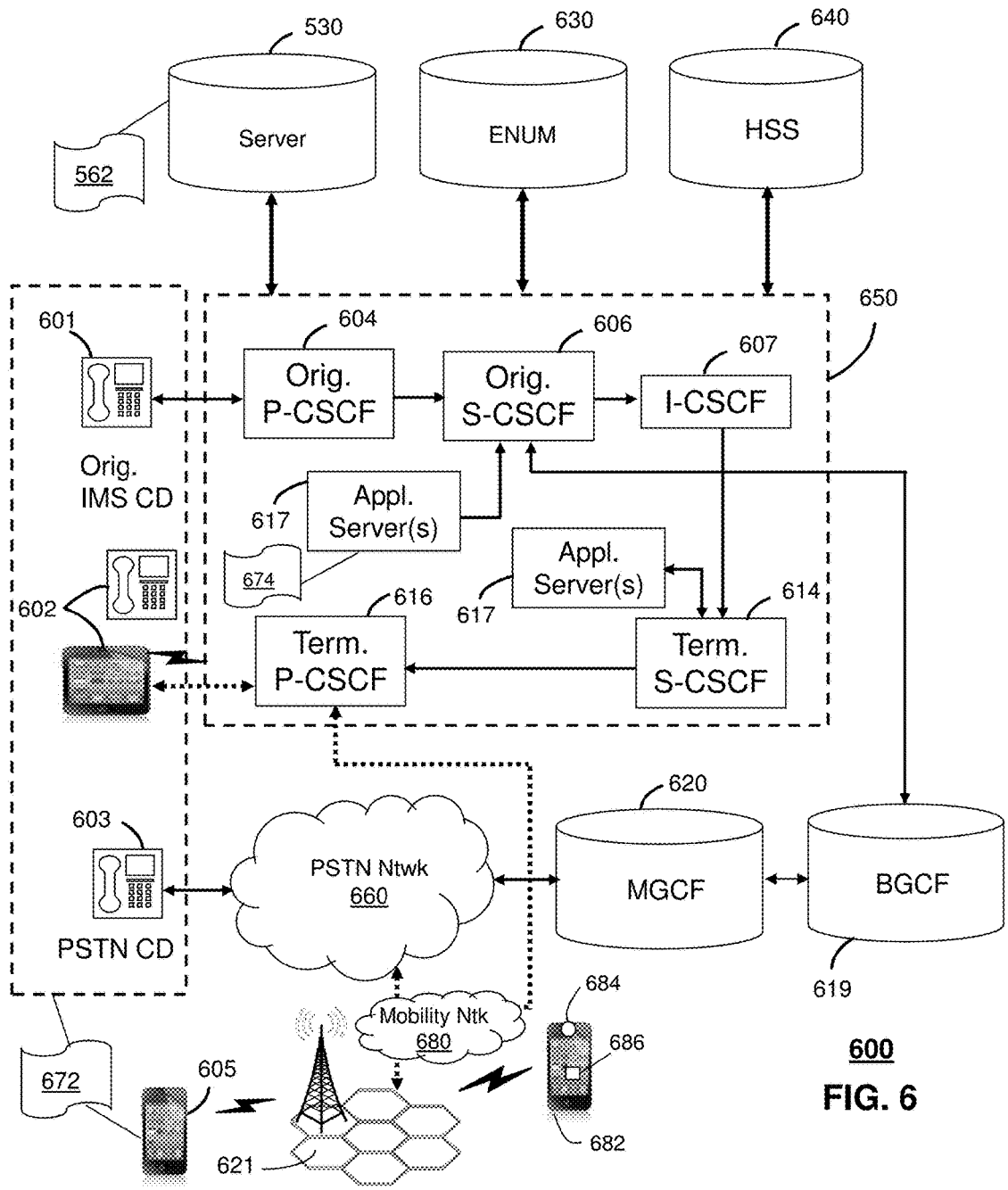

FIG. 6 depicts an illustrative embodiment of a communication system 600 employing an IP Multimedia Subsystem (IMS) network architecture to facilitate the combined services of circuit-switched and packet-switched systems. Communication system 600 can be overlaid or operably coupled with the personal television channel delivery system 100 of FIG. 1 and communication system 500 as another representative embodiment of communication system 500. For instance, one or more devices illustrated in the communication system 600 of FIG. 6, such as the personalized channel server 530, includes a process that receives a request from a mobile device 682 to distribute mobile video content from the mobile device 682 by way of a television service. A particular television channel of the television service is determined by the system based on the request. The mobile video content is received by a wireless access base station 621 and routed through a mobility network 680 to the personalized television channel server 530. The server 530 provides program content including the mobile video content for the particular television channel. The program content is distributed by one or more video head-end servers to a media processor coupled to a television receiver. The television receiver presents the mobile video content at the display.

Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication system 500 of FIG. 5.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a WiFi router, a Digital Enhanced Cordless Telecommunications (DECT) base unit, or another suitable wireless access unit to establish communications with the IMS network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The personalized channel server 530 of FIG. 5 can be operably coupled to communication system 600 for purposes similar to those described above. The personalized channel server 530 can perform function 562 and thereby provide personalized channel delivery services to the CDs 601, 602, 603 and 605 of FIG. 6<similar to the functions described for server 530 of FIG. 5 in accordance with processes 200, 300, 400 of FIGS. 2-4. CDs 601, 602, 603 and 605, which can be adapted with software to perform function 672 to utilize the services of the personalized channel server 530, similar to the functions described for communication devices 516 of FIG. 5 in accordance with processes 200, 300, 400 of FIGS. 2-4. The personalized channel server 530 can be an integral part of the application server(s) 617 performing function 674, which can be substantially similar to function 562 and adapted to the operations of the IMS network 650.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
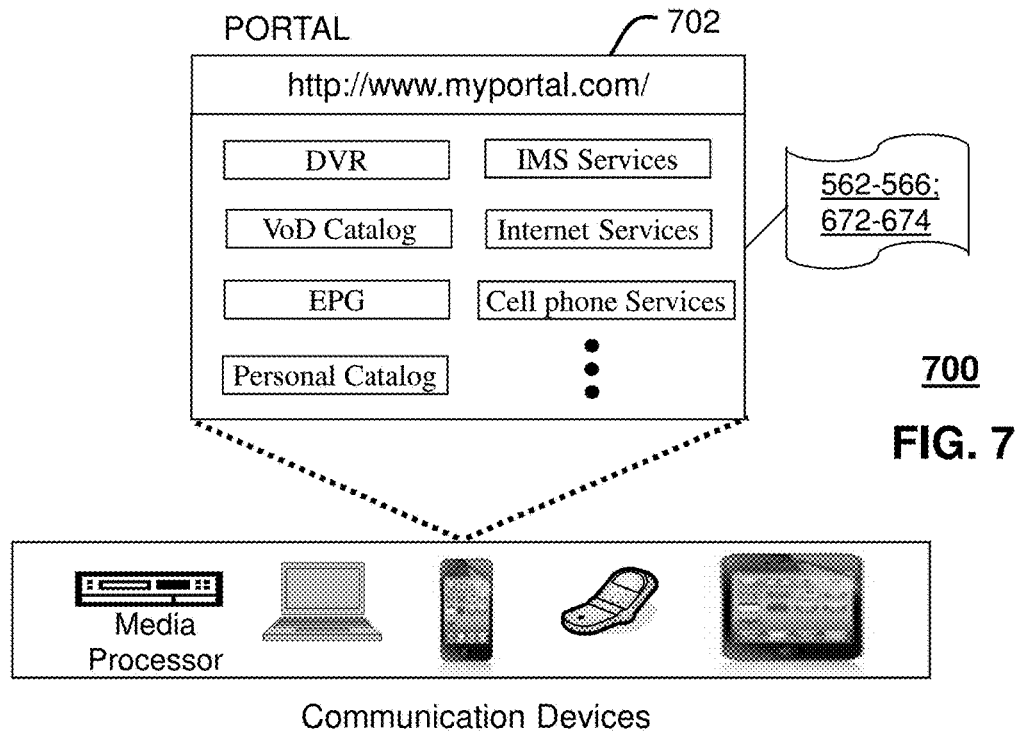
FIG. 7 depicts an illustrative embodiment of a web portal for interacting with the communication systems of FIGS. 1 and 5-6.

FIG. 7 depicts an illustrative embodiment of a web portal 702 of a communication system 700. Communication system 700 can be overlaid or operably coupled with system 100 of FIG. 1, communication system 500, and/or communication system 600 as another representative embodiment of the system 100 of FIG. 1, communication system 500, and/or communication system 600. The web portal 702 can be used for managing services of the system 100 of FIG. 1 and communication systems 500-600. A web page of the web portal 702 can be accessed by a Uniform Resource Locator (URL) with an Internet browser using an Internet-capable communication device such as those described in FIG. 1 and FIGS. 5-6. The web portal 702 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 702 can also be used for provisioning IMS services described earlier, provisioning Internet services, provisioning cellular phone services, and so on.

The web portal 702 can further be utilized to manage and provision software applications 562-566, and 672-674 to adapt these applications as may be desired by subscribers and/or service providers of system 100 of FIG. 1, and communication systems 500-600. For instance, users of the services provided by server 112 or server 530 can log into their on-line accounts and provision the servers 112 or server 530 with any of various features that a user may want to program, such as user profiles, contact information to server to enable it to communication with devices described in FIGS. 1 and 5-6, and so on. Service providers can log onto an administrator account to provision, monitor and/or maintain the system 100 of FIG. 1 or server 530.

By way of example, an author or producer subscriber can customize their personalized television channel via the Internet and either via a Web browser or email using wireless telephone 56, personal computer 54, a personal digital assistant or other Internet communication device. The subscriber would access a network server that is coupled to the television distribution network 114 that allows them to customize the look-and-feel of their personalized television channel and do things such as, modify the default video size, quality, resolution, to provide identifying indicia that can be presented with the video, and/or in a notification message or pop-up sent in connection with availability of personal video content, etc.). In some instances, a user can identify one or more individuals or groups of individuals associated with one or more personalized television channels—one channel for friends, another for family and so forth. Other manageable features can include authorization or access rights to video content. The output of their customization work on the network server would then be coupled to the head-end system or other portion of cable television distribution network 114 and injected into the subscriber channel. The updates to the personalized television channel could take place either in real-time or on-demand. Likewise, a viewer or consumer subscriber can use the web portal 702 to customize one or more features the channels they subscribe to, to enter authorization codes or keys, to manage notification preferences, recording preferences and so forth. Although the concept of a web-portal is disclosed for managing user profiles, provisioning personalized television channels, gaining access to personal channels, video catalogs, and the like, it is understood that other resources can be used. For example, a user can access a user profile by way of a mobile device, e.g., by text messages, and/or apps including mobile apps and client-server apps, and/or a website.

Figure 8:
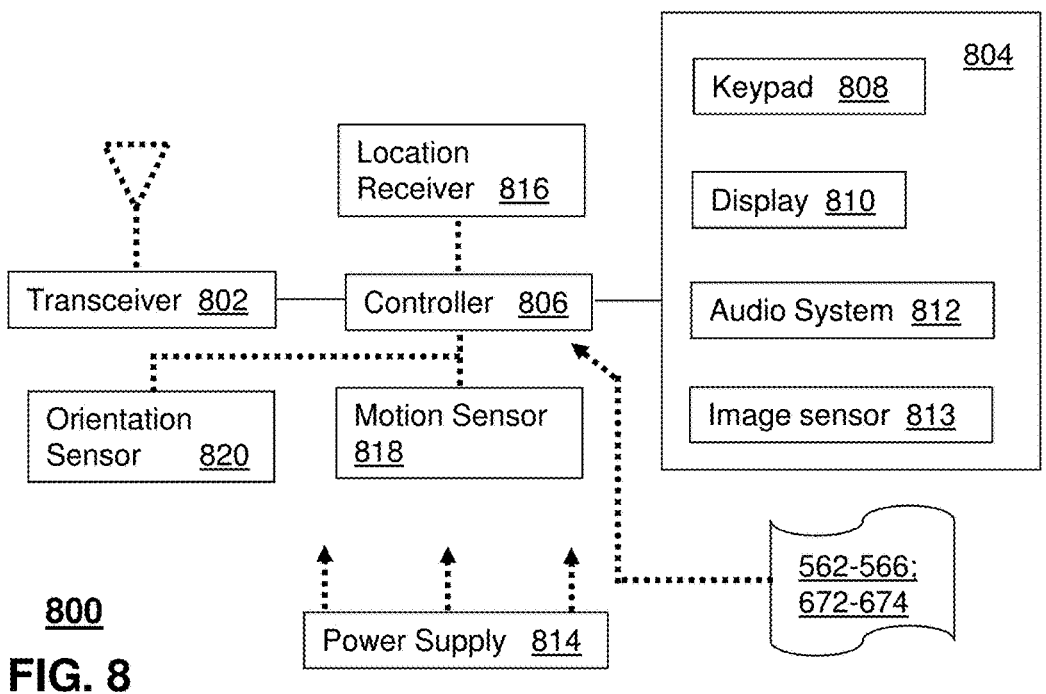
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIG. 1, and FIGS. 5-6. Communication device 800 in whole or in part can represent any of the communication devices described in FIGS. 1 and 5-6 and can be configured to perform portions of processes 200, 300, 400 of FIGS. 2-4. Device 800 can be used for providing media content to a television distribution facility. A portion of the media content can be captured by video camera and transported over a wireless network as streaming media to the television distribution facility. The streaming media can serve as program content of a television channel that can be distributed to equipment of one or more television viewers. Viewer access to the television channel can be unrestricted, as in public, or restricted according to various access-restriction techniques, such as those disclosed herein.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of devices of FIG. 1, the media processor 506, the media devices 508, or the portable communication devices 516 of FIG. 5, as well as the IMS CDs 601-602 and PSTN CDs 603-605 of FIG. 6. It will be appreciated that the communication device 800 can also represent other devices that can operate in the system 100 of FIG. 1, communication systems 500-600 of FIGS. 5-6 such as a gaming console and a media player.

The communication device 800 shown in FIG. 8 or portions thereof can serve as a representation of one or more of the devices of the system 100 of FIG. 1, communication system 500, and communication system 600. In addition, the controller 806 can be adapted in various embodiments to perform the functions 562-566 and 672-675, respectively.

Upon reviewing the aforementioned embodiments, it would be evident to an artisan with ordinary skill in the art that said embodiments can be modified, reduced, or enhanced without departing from the scope of the claims described below. For example, distribution of impromptu video content by personal television channel can be accomplished according to one or more aspects of social media. For example, registered users can view and/or post video clips to a public group and/or to particular subscribers or followers. Users may subscriber to other users' video clips with or without access restriction by the video author or producer. Subscribers to personal channel can form associations for the exchange of information. In some embodiments, when a subscriber chooses to follow another user, the subscriber gains access to a catalog of previously distributed video clips. The catalog may list or otherwise identify such video clips according to a reverse chronological order, according to a rating, or some other aspect associated with the video clip. In at least some instances, the author and/or producer can edit stored video content or clips, e.g., providing titles, subject or other indicia or annotations as may be desired. Users can group video clips together by topic or type by use of a tag, e.g., similar to the hashtags used in Twitter®. (Twitter is a trademark registered to Twitter, Inc.).

A video author or producer can keep followers up to date on a user's status, such as location, by way of rich media content delivered by the personal video channel. Rather than simply receiving a notice that a subscriber is at a particular venue, followers are able to observe rich media content, e.g., an audio and/or video broadcast from the venue itself. The video content might include the author or producer, as in a "selfie" and/or other persons, events and so forth. Distribution of the impromptu video content by way of the personalized content channel can initiate or contribute to an ongoing dialog between subscribers to the service. The dialog can be accomplished by any suitable technique, such as an accompanying conference call, text messages, emails, postings at an online or otherwise network accessible user space. It is also envisioned that one or more of the impromptu video broadcasts and/or ensuing discussions can be made in association with an existing social media service, such as Facebook® or Twitter®. (Facebook® is a trademark registered to Facebook, Inc.). Other embodiments can be used in the subject disclosure.

In some embodiments, broadcast of video content by the personalized television channel can be limited in one or more of duration, size or bandwidth. Such limitations can be valuable to promote sharing of limited bandwidth, such as a personalized channel shared by multiple subscribers. It is understood that such a shared channel might carry personalized channel content of more than one subscriber, intended for consumption by more than one different group.

Access to the content can be controlled according to access restriction techniques, such as those disclosed herein. Thus, a channel may be busy and therefore unavailable during a broadcast if a subscriber does not have authorization. In some embodiments a group of shared personal television channels can be used to serve a group of subscribers. Consider M subscribers having access to N channels, where M>N. At any given moment, it may be unlikely that all subscribers are broadcasting, thus the lesser number of channels N can server the greater number of subscribers M without it being perceptible that channels are being shared. A particular channel of the N channels can be assigned to a particular personalized television channel in an ad hoc manner at the time of an impromptu broadcast. The identity of the particular channel can be provided to subscribers in the form of a notice, and/or in metadata that can be used to notify or otherwise automatically tune the subscribers' television receiver to the particular personalized television channel.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
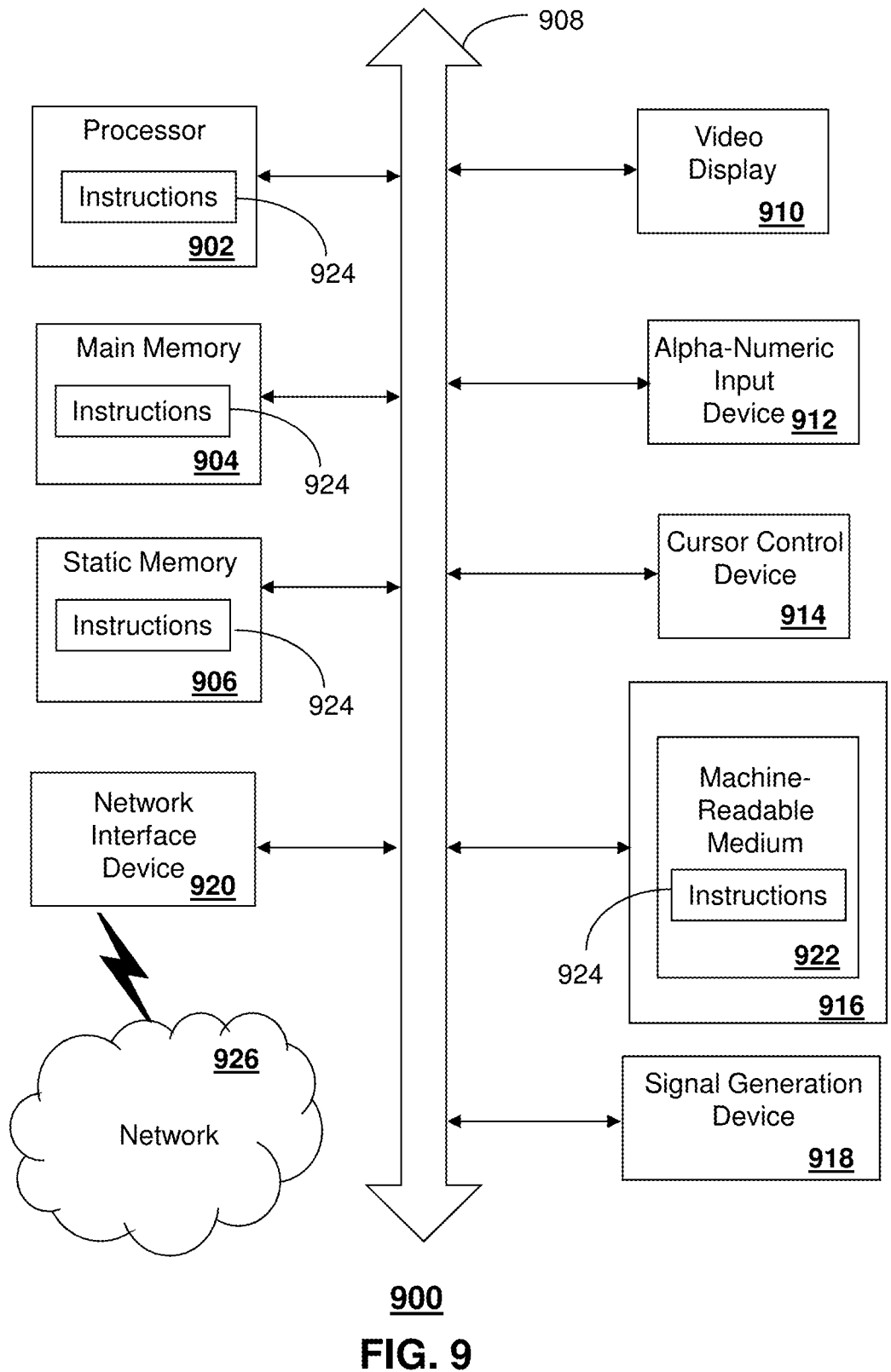
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the personal channel server 530, the media processor 506, the network storage 124, e.g., video catalog server and other devices of FIGS. 1 and 5-6. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, ZigBee®), and long-range communications (e.g., WiMAX, GSM, CDMA, LTE) can be used by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    identifying, by a processing system including a processor and based on a distribution request, a particular television channel of a television distribution service comprising a plurality of television channels;
    receiving, by the processing system, wireless signals from a mobile device;
    extracting, by the processing system, mobile video content from the wireless signals; and
    responsive to the identifying of the particular television channel:
        associating, by the processing system, the mobile video content with the particular television channel to generate an updated television channel that includes the mobile video content, wherein equipment of a television receiver, when tuned to the particular television channel, processes a television signal of the television distribution service to obtain the mobile video content for presentation at a display device; and providing, by the processing system, a notification to equipment of a plurality of viewers, wherein the notification identifies an association of the mobile video content and the particular television channel, and wherein, responsive to the notification, first equipment of a first viewer automatically answers a telephone call from the mobile device indicating availability of the mobile video content.

2. The method of claim 1, wherein the distribution request being received from a mobile device to distribute mobile video content from the mobile device by way of the television distribution service, wherein the mobile video content comprises live video content obtained by the mobile device, and wherein the associating of the mobile video content comprises providing metadata that designates the mobile video content for distribution by the television distribution service according to the particular television channel.

3. The method of claim 2, wherein the providing of the notification comprises sending the notification to a television receiver, and wherein the notification comprises indicia of the mobile device, the particular television channel or a subject matter of the mobile video content.

4. The method of claim 1, wherein a mobile device comprises equipment of a mobile service subscriber, and wherein the particular television channel comprises a personal channel that provides personalized content of the mobile service subscriber by way of the television distribution service.

5. The method of claim 4, further comprising initiating, by the processing system, a voice call between the mobile device and communication equipment of the viewer responsive to selection of the personal channel, wherein viewer access to the mobile video content is subject to access-restriction.

6. The method of claim 1, further comprising:
storing, by the processing system, the mobile video content in a video content repository; and
cataloging, by the processing system, the video content repository based on the storing of the mobile video content, wherein the television distribution service comprises one of a terrestrial broadcast service, a cable delivery service, a satellite delivery service, internet protocol television service or a combination thereof.

7. The method of claim 1, further comprising:
storing, by the processing system, the mobile video content resulting in stored mobile video content;
cataloging, by the processing system, the stored mobile video content;
receiving, by the processing system, a request for the stored mobile video content; and
providing, by the processing system, the stored mobile video content in response to the request.

8. An apparatus comprising:
a memory to store executable instructions; and
a processing system including a processor in communication with the memory, wherein the processing system, responsive to executing the instructions, facilitates performance of operations comprising:
receiving wireless signals from a mobile device;
extracting live video content from the wireless signals;
associating the live video content with a particular television channel of a television distribution service comprising a plurality of television channels to generate an updated television channel that includes the live video content based on a distribution request;
providing notification to equipment of a television receiver, wherein, responsive to the notification, the equipment of the television receiver automatically answers a telephone call from the mobile device indicating availability of the live video content; and
facilitating distribution of a television signal comprising the live video content by way of the television distribution service according to the particular television channel to the equipment of the television receiver to cause the equipment of the television receiver, when tuned to the particular television channel, to process the television signal to obtain the live video content for presentation at a display device.

9. The apparatus of claim 8, wherein the operations further comprise receiving the distribution request to distribute the live video content by way of the television distribution service from the mobile device, wherein the processor comprises a plurality of processors operating in a distributed processing environment, wherein the live video content is obtained by a camera of the mobile device, and wherein the distribution of the television signal to the equipment of the television receiver occurs in near real-time.

10. The apparatus of claim 9, wherein the operations further comprise sending a notification to the equipment of the television receiver that the live video content is available on the particular television channel, and wherein the notification is responsive to the associating of the live video content with the particular television channel.

11. The apparatus of claim 8, wherein the mobile device comprises equipment of a mobile service subscriber, and wherein the particular television channel comprises a personal channel that provides personalized content of the mobile service subscriber.

12. The apparatus of claim 8, wherein the distributing of the television signal to the equipment of the television receiver is associated with a voice call between the mobile device and equipment of a television receiver authorized to receive the television signal.

13. The apparatus of claim 8, wherein the television distribution service comprises one of a terrestrial broadcast service, a cable delivery service, a satellite delivery service, internet protocol television service or a combination thereof.

14. The apparatus of claim 8, wherein the operations further comprise:
storing the live video content resulting in stored video content;
cataloging the stored video content;
receiving a request for the stored video content; and
providing the stored video content in response to the request.

15. A machine-readable storage device, comprising executable instructions which, responsive to being executed by a processing system including a processor in a mobile device, cause the processor to facilitate performance of operations comprising:
generating a request to distribute live video content to a television receiver by way of a video delivery channel of a television distribution service;
sending the request to the television distribution service;
providing authorization information to the television distribution service; and
responsive to receiving a notice that the video delivery channel has been established:

initiating a telephone call with first equipment of a television receiver; and sending the live video content encoded onto wireless signals for distribution according to the television distribution service, wherein equipment of the television receiver, when tuned to the video delivery channel, processes a television signal of the television distribution service to obtain the live video content for presentation at a display device.

16. The machine-readable storage device of claim 15, wherein the processor comprises a plurality of processors operating in a distributed processing environment, wherein the mobile device comprises equipment of a mobile service subscriber, and wherein the video delivery channel comprises a personal channel that provides personalized content of the mobile service subscriber.

17. The machine-readable storage device of claim 16, wherein the operations further comprise determining whether a request to establish the telephone call with the first equipment of the television receiver receiving the video delivery channel.

18. The machine-readable storage device of claim 15, wherein the operations further comprise identifying attributes of the live video content, and wherein the attributes are included with the request.

19. The machine-readable storage device of claim 18, wherein the attributes comprise size, quality, resolution, latency, or a combination thereof.

20. The machine-readable storage device of claim 15, wherein the television distribution service comprises one of a terrestrial broadcast service, a cable delivery service, a satellite delivery service, internet protocol television service or a combination thereof, and wherein the operations further comprise receiving a notification that live video content is available at a mobile device.

* * * * *